United States Patent [19]

Lenz et al.

[11] Patent Number: 4,696,433

[45] Date of Patent: Sep. 29, 1987

[54] BREAKING UP DEVICE FOR USE IN STRAINING TUNS TO OBTAIN WORT IN THE PRODUCTION OF BEER

[76] Inventors: Bernhard Lenz; August Lenz, both of D-8710, Kitzingen, Fed. Rep. of Germany

[21] Appl. No.: 888,370

[22] Filed: Jul. 23, 1986

[30] Foreign Application Priority Data

Aug. 9, 1985 [DE] Fed. Rep. of Germany ....... 3528647

[51] Int. Cl.[4] .............................................. B02C 18/10
[52] U.S. Cl. ............................. 241/199.12; 241/282.1
[58] Field of Search ................ 241/199.12, 277, 282.1, 241/199, 199.2, 199.7, 282.2

[56] References Cited

U.S. PATENT DOCUMENTS 2,881,815  4/1959  Crumley ............................... 241/277

Primary Examiner—Timothy V. Eley
Attorney, Agent, or Firm—Quaintance, Murphy & Presta

[57] ABSTRACT

A cutting or breaking up device 11 is built into a straining tun 10, which is set in rotation following a certain draining off time, in order to loosen up the brewer's grain cakes which have built up on the screen base 15 of the straining tun 10. Cutting device 11 has an upright, motor-powered shaft 16, to which are fastened a plurality of horizontal arms 12, which in turn support rows of cutting blades 13A, 13B. At the bottom ends of these cutting blades 13A, 13B in turn are fastened at least two cutting shoes 14, which cause a rapid, intensive loosening up of the brewer's grain cake upon rotation of the cutting device 11.

15 Claims, 16 Drawing Figures

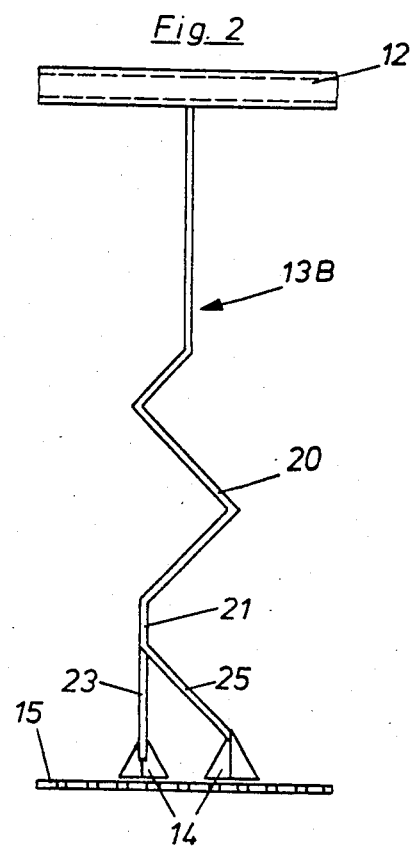
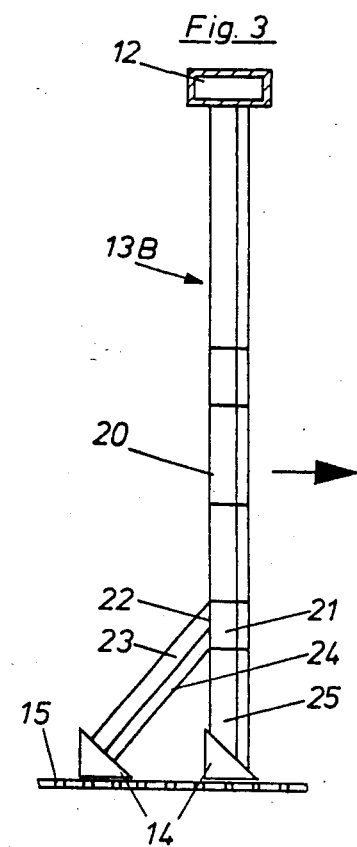
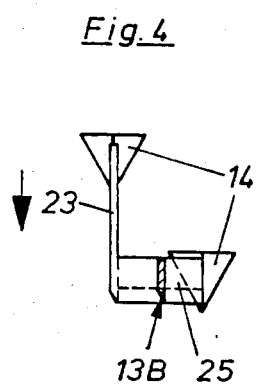
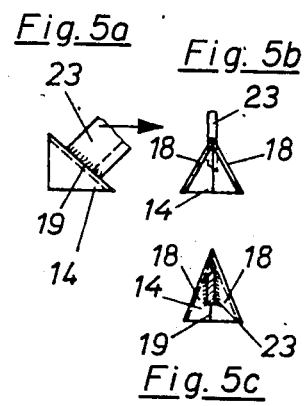

BREAKING UP DEVICE FOR USE IN STRAINING TUNS TO OBTAIN WORT IN THE PRODUCTION OF BEER

BACKGROUND OF THE INVENTION

The present invention relates to a breaking up device for use in straining tuns to obtain wort in the production of beer, with arms fastened horizontally to an upright, motor-powered shaft, each supporting a row of cutting blades, on the bottom ends of which are fastened cutting shoes, in order to loosen up or disaggregate the brewer's grain cakes forming on the screen or filter base of the straining tun, with the clarifying process, along different circular paths.

During a clarifying process to obtain wort for the production of beer, the brewer's grain cake is packed over the screen or filter base of the straining tun, so that prolonged or repeated loosening up of the brewer's grain is required to obtain more wort. This is attained with a cutting device built into the straining tun, which has a plurality of horizontal arms on an upright, motor-powered shaft, each supporting a row of cutting blades projecting downwardly. Thus it is known to fasten a plow-like cutting shoe at the bottom of each cutting blade, and certainly at such a level that these cutting shoes work when the breaking up device is rotating approximately 5-10 mm over the screen of filter base such that they loosen or break up the packed brewer's grain cakes along circular paths. In order to improve this loosening effect, it is already known to arrange the cutting blades with the arms radially offset from each other, so that they produce additional cutting lines with different radii.

However, for an optimum loosening up of the brewer's grain cakes, the breaking up device used up to the present time has had to circulate may times. Since the velocity of circulation of the breaking up device is only 3-5 m per minute, much time has been required for this step. In order to avoid this drawback, i.e., for fewer rotations to be sufficient, the number of arms supporting cutting blades has already been raised to six. But this greater structural outlay is costly and the danger then arises that, because of the large number of cutting blades during circulation of the breaking up device, a "thrust" of the brewer's grain may occur, resulting in a negative influence or even destruction of the filter function of this layer. The wort which is still produced then has a very undesirable turbidity. This drawback can also occur with breaking up devices of which the cutting blades support radial cutting strips at their ends.

SUMMARY OF THE INVENTION

The object of the invention is to avoid the above-mentioned drawbacks and to disclose a breaking up device which causes an intensified loosening up of the brewer's grain layer and requires a relatively short time for this, e.g., a few revolutions with minimal structural outlay. Especially, the number of cutting blades is to be minimized, so that a "shift" of the layer of brewer's grain or a disturbance of its filter function is reliably avoided.

This is attained according to the invention in that at least two cutting shoes are arranged side-by-side at the bottom of each cutting blade, or one after the other in the direction of rotation, so that an intensified loosening up of the brewer's grain cake is produced by cutting shoes circulating on different paths of circulation or on the same circulation path. The greater structural outlay for the additionally required cutting shoes is minimal, and the time savings with loosening up of the packed brewer's grain cake over the screen or filter base is considerable.

Since each cutting blade according to the invention supports a plurality of cutting shoes, the breaking up devices for production of the desired loosening effect need not circulate often, which is an advantage. Cases could even occur when one or even half a revolution suffices. Furthermore, it is important that on the basis of the invention only the "customary," i.e., relatively small number, of cutting blades is required, which also saves on structural cost. With the time savings which can be obtained with the invention due to the loosening up process, the recent requirements regarding operational methods of straining tuns are also covered. These provide for an average of eight to ten strikes or brews per 24 hour period.

In accordance with the present invention, the cutting shoes can be arranged on or fastened to each blade at the same or at different levels.

Another development of the invention is characterized in that at least one arm configured as an additional cutting blade, supporting at least one cutting shoe, is fastened to the bottom or to a bottom portion of the cutting blade. This arm advantageously serves a double function, wherein on the one hand it supports at least one additional cutting shoe and on the other hand it reinforces the cutting power of the main cutting blade.

According to still another development of the invention, if the arm configured as the additional cutting blade is fastened to the rear edge of the cutting blade, within the thickness of its material, there are no projecting parts at the connection point, which could cause an undersirable thrust of the brewer's grain layer in some areas during circulation of the device.

If the device has cutting blades which include a known corrugated section, it is reasonable on the basis of manufacturing technology that the corrugated blade section includes a vertical section, at the rear edge on which is fastened the additional cutting blade facing downwardly, which supports at least one cutting shoe at its free end. The fastening of the additional cutting blade to the main cutting blade is thus markedly simplified and the additional cutting blade can consist of a single piece of smooth material.

Still another development of the invention is characterized in that the additional cutting blade is mounted such that it projects to the side and in the opposite direction from an oblique bottom end of the cutting blade.

One special cost-saving construction is obtained according to still another development of the invention, characterized in that the cutting shoes are fastened directly side-by-side at the bottom of each cutting blade and/or additional cutting blade.

Still another development of the invention is characterized in that an arm is fastened horizontally to a vertical end section of the cutting blade, supporting a plurality of cutting shoes.

If the cutting shoes are not side-by-side, but rather are sequentially one after the other in the direction of rotation at the bottom of the cutting blade, the spacing between these cutting shoes is selected with reference to the velocity of rotation of the breaking up device, so that the layer of brewer's grain broken up by the preceding cutting shoe is entirely or at least partially set aside before engagement by the following cutting shoe.

BRIEF DESCRIPTION OF THE DRAWINGS

The invention is now explained relative to the drawings of exemplary embodiments. They show:

FIG. 2 is an enlarged front elevational view of a cutting blade of the breaking up device as shown in FIG. 1;

FIG. 3 is a side elevational view of the cutting blade shown in FIG. 2;

FIG. 4 is a plan view of the cutting blade shown in FIGS. 2 and 3, without the supporting arm;

FIG. 5 is a side view, a back view and a plan view of one cutting shoe, as is shown in smaller size in FIGS. 1-4 and 6-13;

DESCRIPTION OF THE PREFERRED EMBODIMENTS

Figure 1:
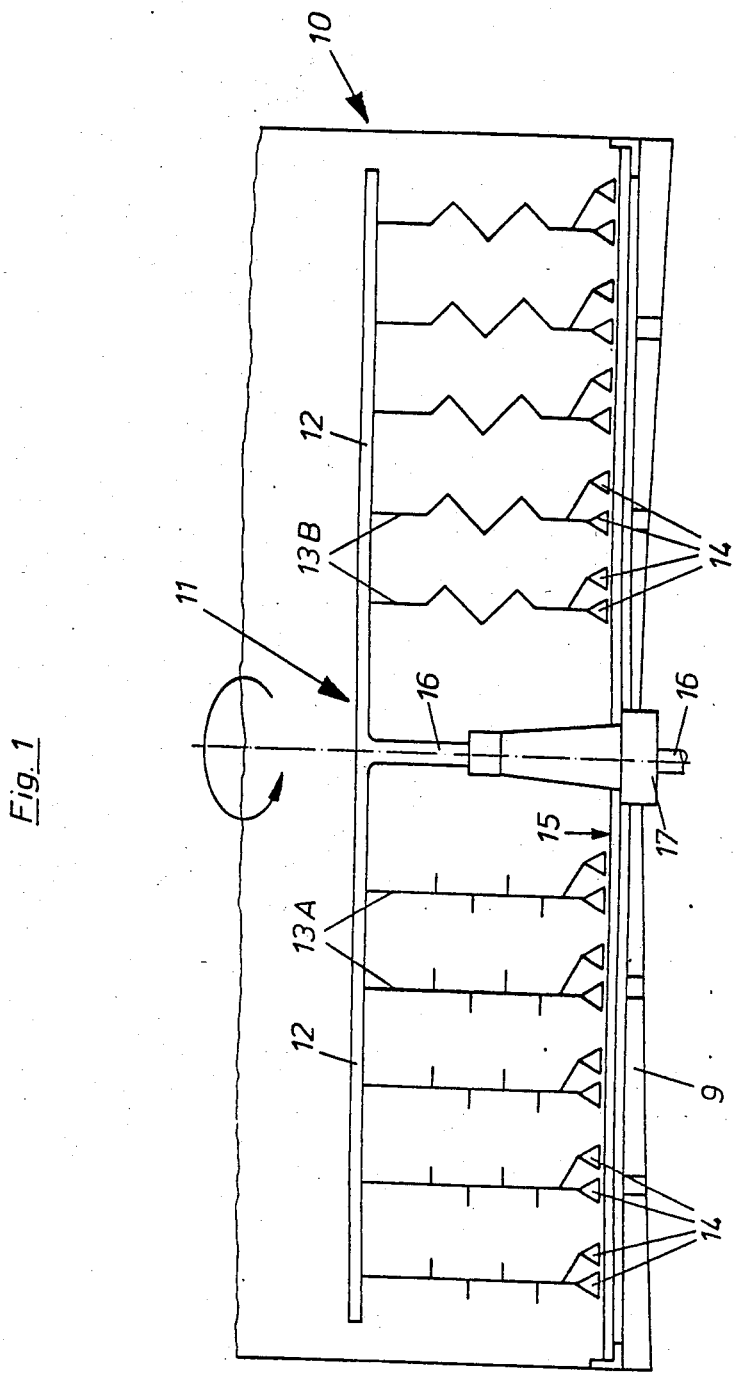
FIG. 1 is a diagrammatic elevational view in section of the bottom of a staining tun with a built-in breaking up device of the present invention, of which the cutting blades each support two cutting shoes.

The straining tun 10, of which only the bottom is shown in FIG. 1, has a circular base and is provided to obtain wort in the production of beer. The mash introduced into tun 10 for this purpose is spread out uniformly by a rotary cutting device 11. Cutting or breaking up device 11, according to the size of straining tun 10, has e.g. two, three or more horizontal or radially extending arms 12, to which are fastened uniformly spaced downwardly extending cutting blades 13A, 13B, which in the exemplary embodiment in FIG. 1 are shown to the left in a straight line configuration 13A and to the right in a corrugated configuration 13B. These cutting blades 13A, 13B at their bottom ends carry plow-like cutting shoes 14 which, circulation or rotation of breaking up device 11 pass directly (at a spacing of approx. 5-10 mm) over the screen or filter base 15 of straining tun 10 and cause loosening or cutting up of the brewer's grain layer which has been formed with the draining off after a certain time on filter base 15. A wort collection space 9 is located below the screen or filter base 15, for the wort which flows through screen or filter base 15. Horizontal arms 12 of cutting device 11 are fastened to a central drive shaft 16, which is mounted vertically in a central bearing part 17 and extends down to a drive motor (not shown). Bearing 17 is supported on the foundation construction of straining tun 10.

To attain an intensified loosening up of the brewer's grain cake deposited in the course of a draining off process on the screen or filter base 15, at least two identical cutting shoes 14 are provided at the bottom of each cutting blade 13A and 13B. Such a cutting shoe 14 is shown in detail in FIG. 5. Each cutting shoe 14 of device 11 comprises a hollow member preferably produced of high quality sheet steel of triangular base, open downward and to the rear and closed at the top of two side walls 18 coming together in the form of a gabled roof, of which the crest line rises obliquely to the rear from the base of cutting shoe 14. Cutting shoes 14 have a plow-like appearance and with circulation of breaking up device 11 they cause the aforementioned loosening up of the brewer's grain cake. The direction of movement of the cutting blades or cutting shoes is indicated by arrows in FIGS. 3, 4, 5, 7, 9, 11 and 13.

As illustrated in FIGS. 2-4, cutting blade 13B has a corrugated or zigzag section 20, which in the bottom area includes a vertical section 21. To the rear edge 22 of this vertical blade section 21 is welded an arm 23, within its material thickness, extending downwardly and outwardly in a direction opposite to the direction of movement of cutting blade 13B. The arm 23 is formed as an additional cutting blade, which means that its front or leading edge 24 is pointed, which is also true for the entire front edge of cutting blade 13B. Cutting shoes 14 are welded or otherwise secured at the same level to the bottom ends of arm 23 and cutting blade 13B. Each arm 23 preferably is fastened at its bottom end by suitable weld seams to the crest line 19 of a cutting shoe 14. The second cutting shoe 14 is welded to a beveled bottom end of an oblique section 25 of cutting blade 13B.

The fastening arrangement of cutting shoe 14 of FIGS. 2-5 is preferred, since it is technically simple. Also, arm 23 is in precise alignment with cutting blade 13B at its connection point, i.e. there is no excess to the side. As shown in FIGS. 2 and 4, with rotation of cutting device 11, cutting shoes 14 run on different circular paths, and arm 23 undertakes an additional cutting function.

Figure 6:
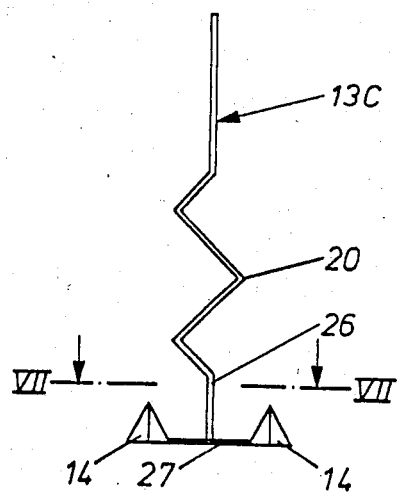
FIG. 6 is a front elevational view of a cutting blade which supports two cutting shoes on one horizontal arm at its bottom.
Figure 7:
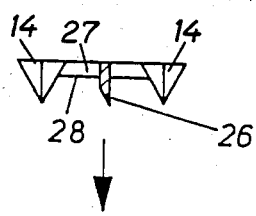
FIG. 7 is a sctional view taken along line VII—VII of FIG. 6.

In the examplary embodiment of FIG. 6, a vertical section 26 is attached to the corrugated or zigzag section 20 of cutting blade 13C projecting downwardly, at the bottom end of which is welded an arm 27 in horizontal position. Cutting shoes 14 are welded on at the same level at the free ends of this arm 27. This arm 27 can also be constructed as an additional cutting blade, and therefore can include a pointed front edge 28.

Figure 10:
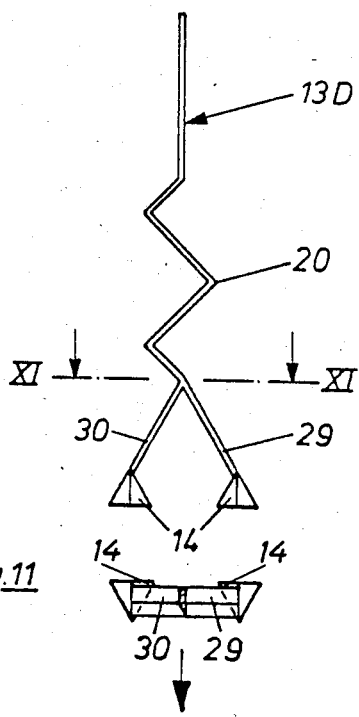
FIG. 10 is a front elevational view of another cutting blade with two cutting shoes.
Figure 11:
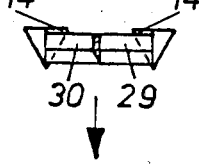
FIG. 11 is a sectional view taken along line XI—XI of FIG. 10.

In the exemplary embodiment of FIG. 10, an arm 30 which is likewise constructed as additional cutting blade is welded on projecting obliquely from an oblique bottom end section 29 of cutting blade 13D. In the embodiments of FIGS. 6-10, as in the exemplary embodiment of FIGS. 2-4, the cutting shoes 14 on cutting blade 13C or 13D produce circular cuts with different radii in the brewer's grain cake (not shown) on filter base 15.

Figure 8:
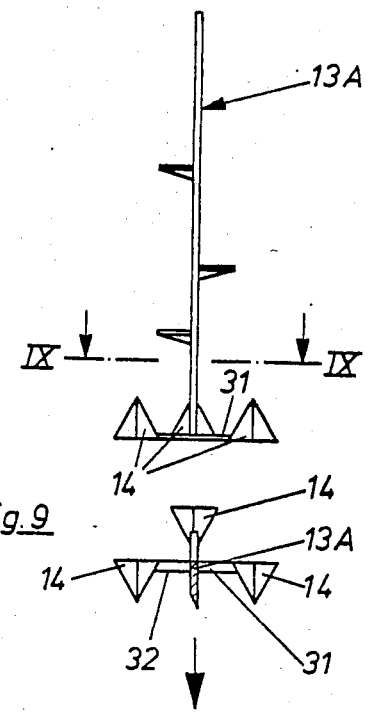
FIG. 8 is a front elevational view of another embodiment of a straight line cutting blade, which has three cutting shoes at the bottom.
Figure 9:
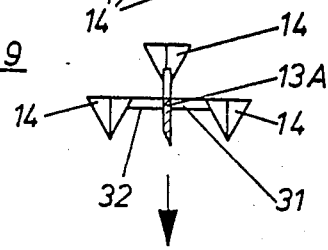
FIG. 9 is a sectional view taken along line IX—IX of FIG. 8.
Figure 12:
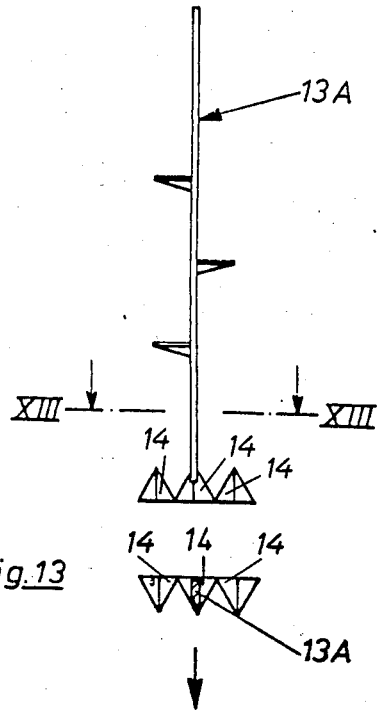
FIG. 12 is a front elevational view of still another embodiment of a straight line cutting blade, which supports three side-by-side cutting shoes at the bottom.

In FIGS. 8 and 12, a cutting blade 13A is shown extending downwardly from the supporting arm (not shown), which corresponds to the blades shown to the left in FIG. 1, with different cutting shoe arrangements on their bottom ends. For example, cutting shoe 14 may be welded to the bottom end of cutting blade 13A in FIG. 8 to the rear and in the middle of a horizontal arm 31, which at its free ends carries two more welded-on cutting shoes 14. As FIG. 8 shows, all three cutting shoes 14 are on the same level. Arm 31 is also configured in this case as an additional cutting blade and, therefore, has a pointed front edge 32.

Figure 13:
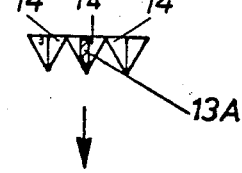
FIG. 13 is a sectional view taken along line XIII—XIII of FIG. 12.

In the exemplary embodiment of FIGS. 12 and 13, three cutting shoes 14 are welded together side-by-side at the same level, and the middle cutting shoe 14 is welded onto the bottom end of cutting blade 13A. While in the embodiment of FIGS. 8 and 9 the three cutting shoes 14 produce separate cutting circles with correspondingly different radii in the brewer's grain cake, the three cutting shoes 14 of FIGS. 12 and 13 loosen up the brewer's grain cakes along one single circular path of desired or suitable width.

It is to be assumed from the above description that in a modification of the examplary embodiments more than two or three cutting shoes could also be fastened to the bottom ends of the cutting blades and also at different levels. Furthermore, more than one additional cutting blade can also be arranged on each main cutting blade, and it can be of any desired form. It is important however that no "blocking" excesses be present at the connection points of these arms with the relevant cutting blades.

Preferably, similar cutting blades are fastened to each arm 12 of cutting or breaking up device 11, but their shape and arrangement can differ from arm to arm. Furthermore it is preferable that not only the cutting blades but also their cutting shoes be arranged radially offset from one to another arm 12 of device 11, in order to produce correspondingly varied cutting circles in the brewer's grain cakes.

What is claimed is:

1. Breaking up device for use in a straining tun having a filter base to obtain wort in the production of beer, the device comprising laterally extending arms fastened to an upright, rotatable shaft, the arms supporting a row of radially spaced cutting blades having bottom ends, cutting shoes fastened to the bottom ends of the cutting blades in order to loosen up brewer's grain cakes on the filter base of the straining tun along different circular paths when the shaft is rotated, characterized in that at the bottom end of each cutting blade (13) are arranged at least two cutting shoes (14) side by side, so that an intensified loosening up of the brewer's grain cake is produced by the cutting shoes (14) of each blade (13) rotating on different circular paths.

2. Device as in claim 1, characterized in that the cutting shoes (14) are arranged at the same level on each blade (13).

3. Device as in claim 1, characterized in that the cutting shoes (14) are arranged at different levels on each blade (13).

4. Device as in claim 1, characterized in that at the bottom of the cutting blade (13) is fastened at least one arm (23, 27, 30, 31) configured as an additional cutting blade, which supports at least one cutting shoe (14).

5. Device as in claim 4, characterized in that the cutting blade (13B) has a back edge, and the arm (23) is fastened on the back edge of the cutting blade (13B) and extends rearwardly therefrom.

6. Device as in claim 5 wherein the cutting blades have a corrugated section, characterized in that the corrugated blade section (20) of each cutting blade includes a vertical section (21) at the back edge (22) to which is fastened the additional cutting blade (23) running downwardly, which at its free end supports at least one cutting shoe (14).

7. Device as in claim 4, characterized in that the cutting blade (13D) has an oblique bottom end section (29) extending laterally to one side thereof, and the additional cutting blade (30) is fastened to the oblique bottom end section (29) of the cutting blade (13D) and extends laterally to the other side thereof.

8. Device as in claim 1, characterized in that the cutting shoes (14) at the bottom end of each cutting blade (13A) are connected to each other directly side by side.

9. Device as in claim 1, characterized in that laterally extending arm (27, 31) is fastened to a vertical end section (26) of the cutting blade (13C, 13A), which supports a plurality of cutting shoes (14).

10. Breaking up device for use in a straining tun having a filter base to obtain wort in the production of beer, the device laterally extending arms fastened to an upright, rotatable shaft, the arms supporting a row of radially spaced cutting blades having bottom ends, cutting shoes fastened to the bottom ends of the cutting blades in order to loosen up brewer's grain cakes on the filter base of the straining tun along different circular paths when the shaft is rotated, characterized in that at the bottom end of each cutting blade (13) are arranged at least two cutting shoes (14) sequentially one after the other in the direction of rotation, so that an intensified loosening up of the brewer's grain cake is produced by the cutting shoes (14) of each blade (13) rotating on the same circular path.

11. Device as in claim 10, characterized in that the cutting shoes (14) are arranged at the same level on each blade (13).

12. Device as in claim 10, characterized in that the cutting shoes (14) are arranged at different levels on each blade (13).

13. Device as in claim 10, characterized in that at the bottom of the cutting blade (13) is fastened at least one arm (23, 27, 30, 31) configured as an additional cutting blade, which supports at least one cutting shoe (14).

14. Device as in claim 13, characterized in that the cutting blade (13B) has a back edge, and the arm (23) is fastened on the back edge of the cutting blade (13B) and extends rearwardly therefrom.

15. Device as in claim 14 wherein the cutting blades have a corrugated section, characterized in that the corrugated blade section (20) of each cutting blade includes a vertical section (21) at the back edge (22) to which is fastened the additional cutting blade (23) running downwardly, which at its free end supports at least one cutting shoe (14).

* * * * *

UNITED STATES PATENT AND TRADEMARK OFFICE
CERTIFICATE OF CORRECTION

PATENT NO. : 4,696,433
DATED : September 29, 1987
INVENTOR(S) : Bernhard Lenz et al It is certified that error appears in the above-identified patent and that said Letters Patent are hereby corrected as shown below:

Claim 10, line 3, after "device", insert --comprising--.

Signed and Sealed this

Twenty-second Day of March, 1988

Attest:

DONALD J. QUIGG

*Attesting Officer*  *Commissioner of Patents and Trademarks*